(12) United States Patent
Smith

(10) Patent No.: US 6,684,807 B1
(45) Date of Patent: Feb. 3, 2004

(54) SMITH MOSES HYDRO LIFT FLAPS

(76) Inventor: Joseph Alan Smith, P.O. Box 16951, Mobile, AL (US) 36616

(*) Notice: Subject to any disclaimer, the term of this patent is extended or adjusted under 35 U.S.C. 154(b) by 0 days.

(21) Appl. No.: 10/354,353

(22) Filed: Jan. 30, 2003

(51) Int. Cl.[7] .................................................. B63B 1/22
(52) U.S. Cl. ..................................... 114/285; 114/67 R
(58) Field of Search .......................... 114/271, 284–287, 114/67 R, 145 A

(56) References Cited

U.S. PATENT DOCUMENTS

| | | | | |
|---|---|---|---|---|
| 3,159,131 A | * | 12/1964 | Frederick | 114/285 |
| 3,327,671 A | * | 6/1967 | Comins | 114/285 |
| 4,862,820 A | | 9/1989 | Guezou et al. | |
| 4,977,845 A | * | 12/1990 | Rundquist | 114/289 |
| 5,193,478 A | * | 3/1993 | Mardikian | 114/285 |
| 5,311,832 A | | 5/1994 | Payne | |
| 5,404,830 A | * | 4/1995 | Ligozio | 114/282 |
| 5,481,996 A | * | 1/1996 | Osawa et al. | 114/67 R |

\* cited by examiner

Primary Examiner—Jesus D. Sotelo

(57) ABSTRACT

The flaps (101) are fastened to the bottom of the boat, with hinges (122) and are extended under the moving boat to generate lift or cause drag. The area of the flaps (101) can be increased with extensions (102). Slots (104) are present on the flaps (101) to relieve vortexes and some drag. Lift amount can be regulated by the amount of flap presentation and by use of the extensions (102). Flaps are individually controllable or can be moved in unison. Increased drag will result from extreme extension of the flaps. The number of flaps, fastened to the boat forward of the stern, can be two, four or more if desired. Complete retraction of the flaps will result in a smooth bottom

5 Claims, 3 Drawing Sheets

SMITH MOSES HYDRO LIFT FLAPS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention related to boats, specifically to a method of improving the performance of boats.

2. Background of the Invention

Boat bottoms have traditionally been designed to disturb the water flow around the boat, as little as possible.

This smooth flow did little to contribute positive forces which would enhance the boats speed or decrease propulsion fuel consumption.

Steering is primarily done with a deflected plane (rudder) installed at the rear of the boat, No external method was available to level an uneven or listing boat, caused by damage or improper loading.

Stopping a boat was done primarily by reversing the propulsion (propellers) which caused severe strains and possible damage to the boat.

BACKGROUND OF INVENTION-OBJECTS AND ADVANTAGES

Accordingly several objects and advantages of the present invention are:

(a) the Smith Moses Hydro Lift flaps, when partially extended, will generate upward lift forces which will partially lift the boat. This decreased draft will project less frontal area and will enable the boats speed to increase.

(b) the decreased drag caused by decreased frontal area will allow decreased fuel usage.

(c) one or more of the flaps can be extended to raise the desired areas and level an uneven boat.

(d) the flaps on one side of the boat, can be extended radically causing excessive drag on one side of the boat and turning the boat.

(e) All flaps can be extended radically to increase total drag and act as brakes to stop a boats forward progress.

Further objects and advantages of the Smith Moses Hydro Lift Flaps are to disturb the laminar flow of water on the bottom of the boat and cancel any downward lift generated. Still further objects and advantages will become apparent from a consideration of the ensuing description and drawings.

SUMMARY

In accordance with the present invention, a flap or flaps are fastened to the boat bottom forward of the stem with hinges and extended into the water flow.

WINGS—FIGURES

WINGS—Reference Numerals

| | | | |
|---|---|---|---|
| 101 | flap | 102 | flap extension |
| 103 | boat bottom | 104 | flap slots |
| 105 | actuating arm end | 106 | actuating cylinder position |
| 107 | actuating cylinder | 108 | actuating piston hinge pin |
| 109 | actuating cylinder boss | 110 | actuating cylinder pin |
| 112 | flat extension guide | 113 | extension piston |
| 115 | extension cylinder | 117 | extension cylinder mounting |
| 118 | actuating cylinder mounting | | |

DETAILED DESCRIPTION—FIG. 1— PREFERRED EMBODIMENT

Figure 1:
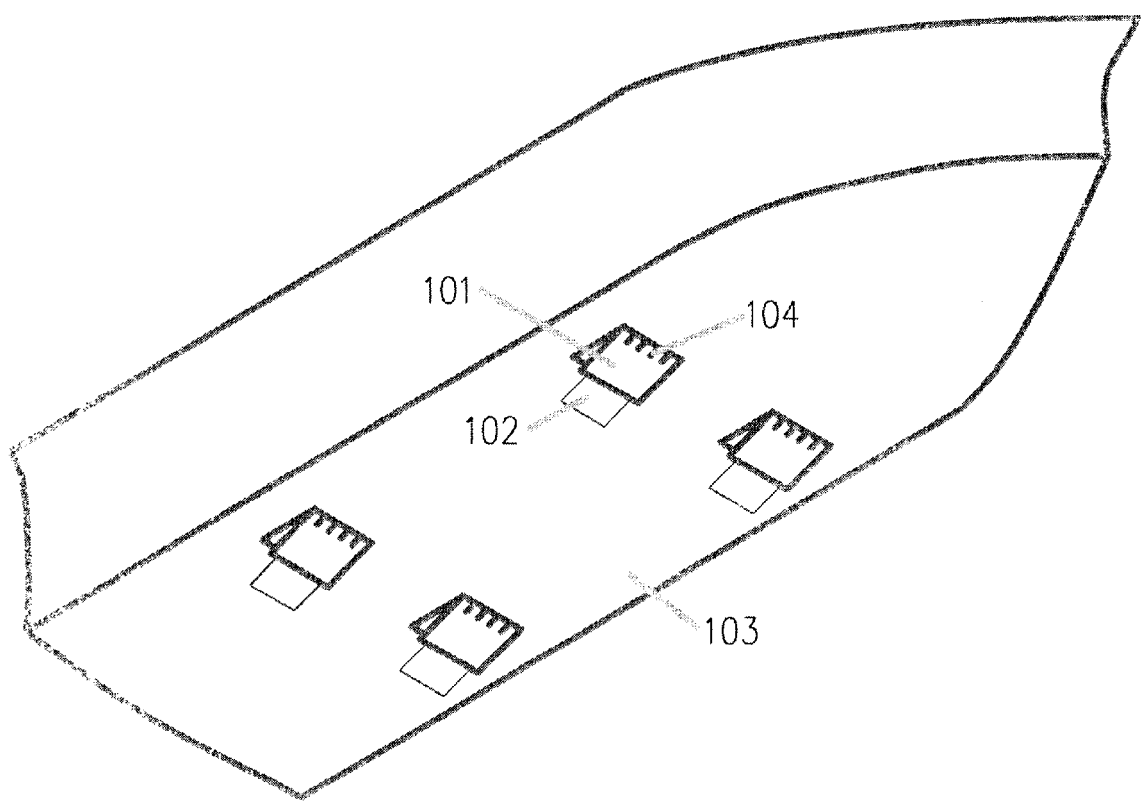
FIG. 1 shows four extended flaps and flap extensions as installed on a boat bottom

FIG. 1 shows a perspective view of a basic version of the Smith Moses Hydro Lift Flaps as installed on a boat bottom Note that the flaps (101) are fastened to the boat bottom at the forward edge, where the hinge is located. The FIG. 1 shows four flaps, however fewer or more flaps may be used. The extensions (102) are also shown in FIG. 1, and the slots (104) can be seen. The slots are openings in the flaps located a short distance from the hinges. The slot openings may be round or other shape, as desired. The flaps and the extensions are both shown in the employed positions.

Figure 2:
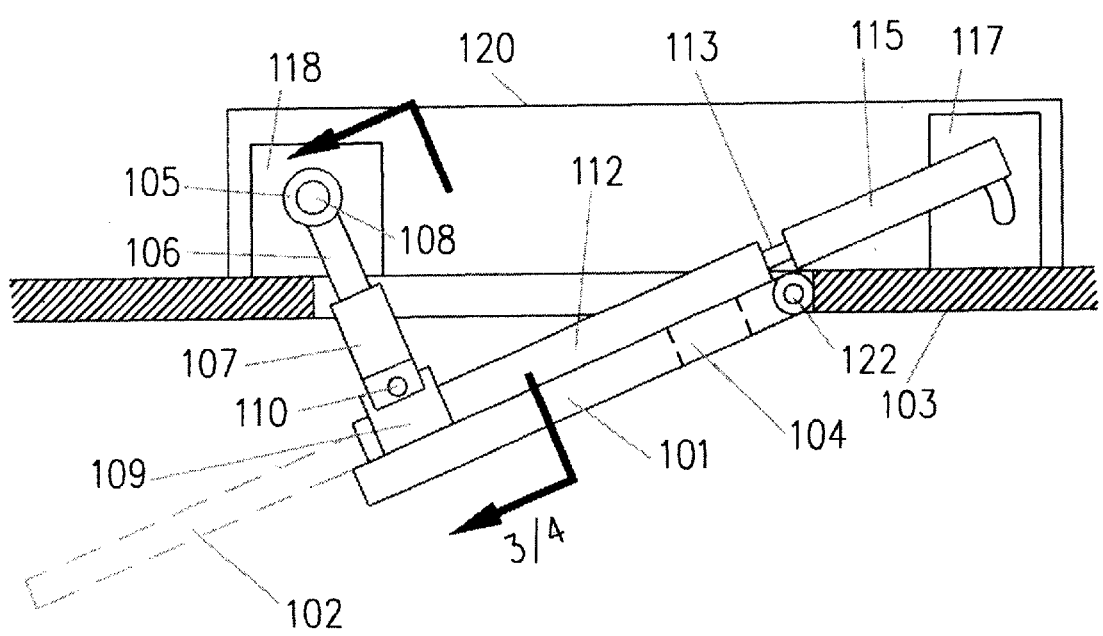
FIG. 2 shows a side view of an extended flap and extendable extension.

FIG. 2 is a side view of the flaps (101) shown in the extended position. The flap actuation cylinders and attaching parts are shown as (105), (106), (107), (108), (109), (110), and (118). The flap extension (102) is shown in dotted lines and the extension actuation cylinders and their attaching parts are shown as (112), (113), (115) and (117). The slots can be seen as (104) and the hinge as (122).

The entire flap unit is encased in a housing shown as (120) that is attached to the boat bottom (105).

Figure 3:
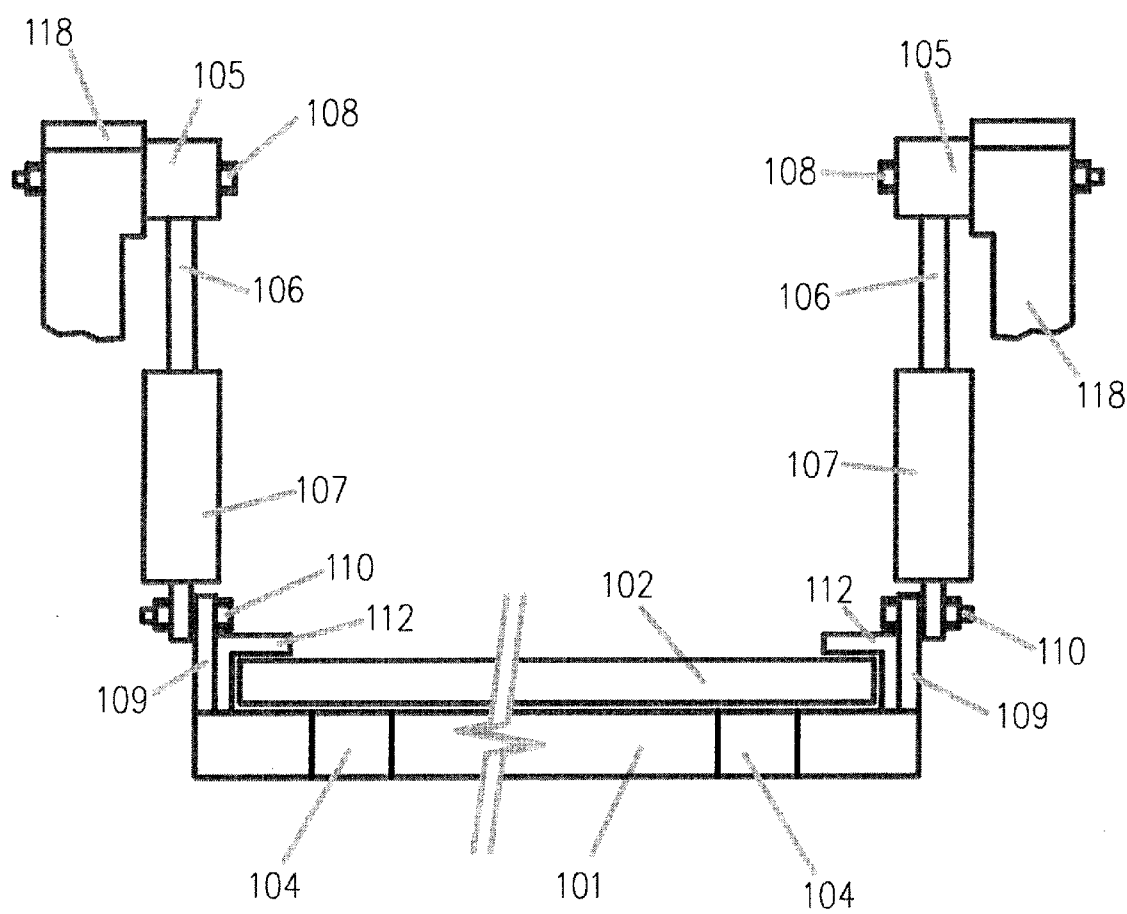
FIG. 3 shows a cross section of a flap.

The indicated section 3/3 is shown in FIG. 3. The section is shown to provide more detail and shows the slots (104) as two, however any number may be used.

OPERATION OF INVENTION

Flap operation devices can be powered by air, water, oil, electricity or other means. Activation device numbers per flap (107, 112) can be one or more. The flaps (101) can be extended small amount (minimally) and will generate lift. This lift, if only one flap is activated, will lift the desired boat area. Boat trim can be accomplished with no cargo movement necessary. Extension of all flaps minimally will lift the boat and decrease draft (boat projection into the water) and the decreased frontal area will result in less overall boat drag. This decrease boat drag will result in higher top boat speed and less boat fuel consumption. The flap extension (102) can be used to increase flap area and resultant lift generated.

Individual flap operation, on one side of the boat only, will generate drag on only one side of the boat, and can be used to steer the boat. The boat can be steered with no rudder deflection or use. The steering drag action will result from extensive flap extension.

All flaps extended extensively will brake the boat and create the boat to stop.

Slots are installed in the flaps, to mitigate vortexes and resultant drag. The flap components (101, 102, 104, 105, 106, 107, 108, 109, 110, 112, 113, 115, 117 and 118) are to show the flap construction and flap operating mechanism. The flaps can be of desired size and configuration. The flaps are to be fastened to the bottom of the boat, forward of the stem.

The flap position indicators and operating controls can be of electronic, mechanically or other wise operation. The instruments and controls can be located on the bridge, control room or other ship locations.

CONCLUSION, RAMIFICATIONS AND SCOPE OF INVENTION

Thus the reader will see that the installation of smith Moses Flaps on boat bottoms will provide a new and novel method to enhance boat operation, speed, fuel, consumption, maneuvering and stopping.

While my above description comparing many specifications, they should not be construed as limitations on the scope of the invention. But rather as an exemplification of one preferred thereof Many other variations are possible. Accordingly, the scope of the invention should be determined not by the embodiments illustrated, but by the appended claims and their legal equivalents.

I Claim:

1. An improved boat construction, comprising:
a boat hull having a bottom, a bow and a stern; the hull bottom including a plurality of flaps secured on the bottom of the hull by hinge means located at the forward edge of each flap; said flaps being located forwardly of the stern; means for extending and retracting the rear edge of each flap into and out of the water flow, such that when said flaps are extended into the water flow an upward force is created to partially lift the hull and thereby decrease the boat draft.

2. The boat construction as in claim 1, wherein the flaps are constructed as telescopic sections which are extended by the extending means.

3. The boat construction as in claim 1, wherein each flap includes a plurality of openings along the forward edge for mitigating parasitic drag.

4. The boat construction as in claim 1, wherein each flap is individually controlled permitting any combination of flaps to be operated simultaneously or independently.

5. The boat construction of claim 1, wherein each flap can be lowered up to 90 degrees into the water flow to provide a braking force on the hull.

\* \* \* \* \*

UNITED STATES PATENT AND TRADEMARK OFFICE
CERTIFICATE OF CORRECTION

PATENT NO. : 6,684,807 B1
DATED : February 3, 2004
INVENTOR(S) : Joseph Alan Smith It is certified that error appears in the above-identified patent and that said Letters Patent is hereby corrected as shown below:

<u>Title page, Item [54] and Column 1, line 1,</u>
Delete "SMITH MOSES HYDRO LIFT FLAPS" and insert -- MARINE HYDRO LIFT FLAPS --

Signed and Sealed this

Twenty-fifth Day of May, 2004

JON W. DUDAS
*Acting Director of the United States Patent and Trademark Office*